United States Patent
Agarwal et al.

(10) Patent No.: US 11,182,313 B2
(45) Date of Patent: Nov. 23, 2021

(54) SYSTEM, APPARATUS AND METHOD FOR MEMORY MIRRORING IN A BUFFERED MEMORY ARCHITECTURE

(71) Applicant: Intel Corporation, Santa Clara, CA (US)

(72) Inventors: Ishwar Agarwal, Portland, OR (US); Theodros Yigzaw, Sherwood, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 16/424,875

(22) Filed: May 29, 2019

(65) Prior Publication Data
US 2019/0278721 A1    Sep. 12, 2019

(51) Int. Cl.
*G06F 12/00*     (2006.01)
*G06F 13/16*     (2006.01)
*G06F 12/0831*   (2016.01)
*G06F 12/0868*   (2016.01)

(52) U.S. Cl.
CPC ...... *G06F 13/1673* (2013.01); *G06F 12/0835* (2013.01); *G06F 12/0868* (2013.01)

(58) Field of Classification Search
CPC ............ G06F 13/1673; G06F 12/0835; G06F 12/0868; G06F 11/1658; G06F 11/1666; G06F 2212/286; G06F 2212/657; G06F 9/44505; G06F 9/5072; G06F 11/004; G06F 11/07
See application file for complete search history.

(56) References Cited

U.S. PATENT DOCUMENTS

| | | | | |
|---|---|---|---|---|
| 5,291,494 A | * | 3/1994 | Bruckert | G06F 11/0724 714/24 |
| 5,864,657 A | * | 1/1999 | Stiffler | G06F 11/1438 714/15 |
| 5,991,852 A | * | 11/1999 | Bagley | G06F 11/2043 361/679.32 |
| 6,393,582 B1 | * | 5/2002 | Klecka | G06F 11/1441 714/10 |
| 8,028,192 B1 | * | 9/2011 | Kekre | G06F 11/1662 714/13 |

(Continued)

OTHER PUBLICATIONS

Dr. Debendra Das Sharma, "CXL Compute Express Link," 3 pages, at least as early as Mar. 2019.

*Primary Examiner* — David Yi
*Assistant Examiner* — Tahilba O Puche
(74) *Attorney, Agent, or Firm* — Trop, Pruner & Hu, P.C.

(57) ABSTRACT

In one embodiment, an apparatus includes: a first memory controller to control access to a first memory, the first memory controller including a memory mirroring circuit, in response to a memory write request from a first processor socket for which the first memory comprises a primary memory region, to cause data associated with the memory write request to be written to the first memory and to send a shadow memory write request to a second memory to cause the second memory to write the data into a secondary memory region; and a shadow memory table including a plurality of entries each to store an association between a primary memory region and a secondary memory region. The memory mirroring circuit may access the shadow memory table to identify the secondary memory region. Other embodiments are described and claimed.

21 Claims, 11 Drawing Sheets

(56) References Cited

U.S. PATENT DOCUMENTS

| | | | |
|---|---|---|---|
| 2002/0144177 A1* | 10/2002 | Kondo | G06F 11/1441 |
| | | | 714/13 |
| 2011/0131373 A1* | 6/2011 | Kumar | G06F 11/2089 |
| | | | 711/113 |
| 2011/0238909 A1* | 9/2011 | Kumar | G06F 12/0866 |
| | | | 711/114 |
| 2014/0304469 A1* | 10/2014 | Wu | G06F 3/0689 |
| | | | 711/114 |
| 2015/0169224 A1* | 6/2015 | Alexander | G06F 12/0223 |
| | | | 711/162 |
| 2016/0378344 A1* | 12/2016 | Nachimuthu | G06F 9/4403 |
| | | | 711/103 |
| 2019/0042455 A1 | 2/2019 | Agarwal et al. | |
| 2019/0065272 A1 | 2/2019 | Rao et al. | |
| 2019/0095363 A1 | 3/2019 | Agarwal et al. | |

\* cited by examiner

SYSTEM, APPARATUS AND METHOD FOR MEMORY MIRRORING IN A BUFFERED MEMORY ARCHITECTURE

TECHNICAL FIELD

Embodiments relate to memory communications in a computing system.

BACKGROUND

In many computing systems, especially high availability computing systems, mirrored memory is provided. With this feature, two memory channels are provided for a single memory controller that interfaces with a memory. One such memory channel is set up as a primary channel and the other is set up as a secondary channel. With a system configured in this manner, all writes are sent to both memory channels. Reads however are serviced by the primary channel. Should a failure occur at the primary channel, data can be obtained from the secondary channel. While this memory mirroring implementation can work relatively well in the context of a single memory controller that oversees multiple channels of memory, this conventional memory mirroring operation does not extend where the different memories are not associated with the same memory controller. And, there can still be failures due to the locality of the channels.

DETAILED DESCRIPTION

In various embodiments, memory mirroring is provided in a system in which primary and secondary memories are in different memory devices, where these memory devices may be associated with different memory controllers and may couple to different processor sockets of a multi-socket computing system. In embodiments herein, memory mirroring flows may utilize both memory and input/output (IO) communication protocols that may be leveraged using a common interconnect, e.g., by time multiplexing. In embodiments herein, a configuration process may occur to set up primary and secondary memories, which may be located at disparate points of the system. Once these memory devices are set up, write requests are issued via a memory communication protocol to a primary memory device and the primary memory device may be configured to reflect or shadow the same write request to the secondary memory device, e.g., via an IO communication protocol. In normal operation, read requests may be satisfied by the primary memory via the memory communication protocol. However if a failure is detected on the primary memory device, the primary memory device may direct the read request, e.g., via the 10 communication protocol to the secondary memory device.

In embodiments, mirroring may be supported across memory devices, where one or more of these memory devices may couple to a host processor via an IO link. In this way, the mirrored memory devices can be located anywhere in a computing platform. Still further, with additional hot plug capabilities, a failed memory device may be removed and replaced without rebooting the system. Embodiments thus provide cross-socket and cross-channel mirroring or shadowing in a buffered memory architecture.

Figure 1:
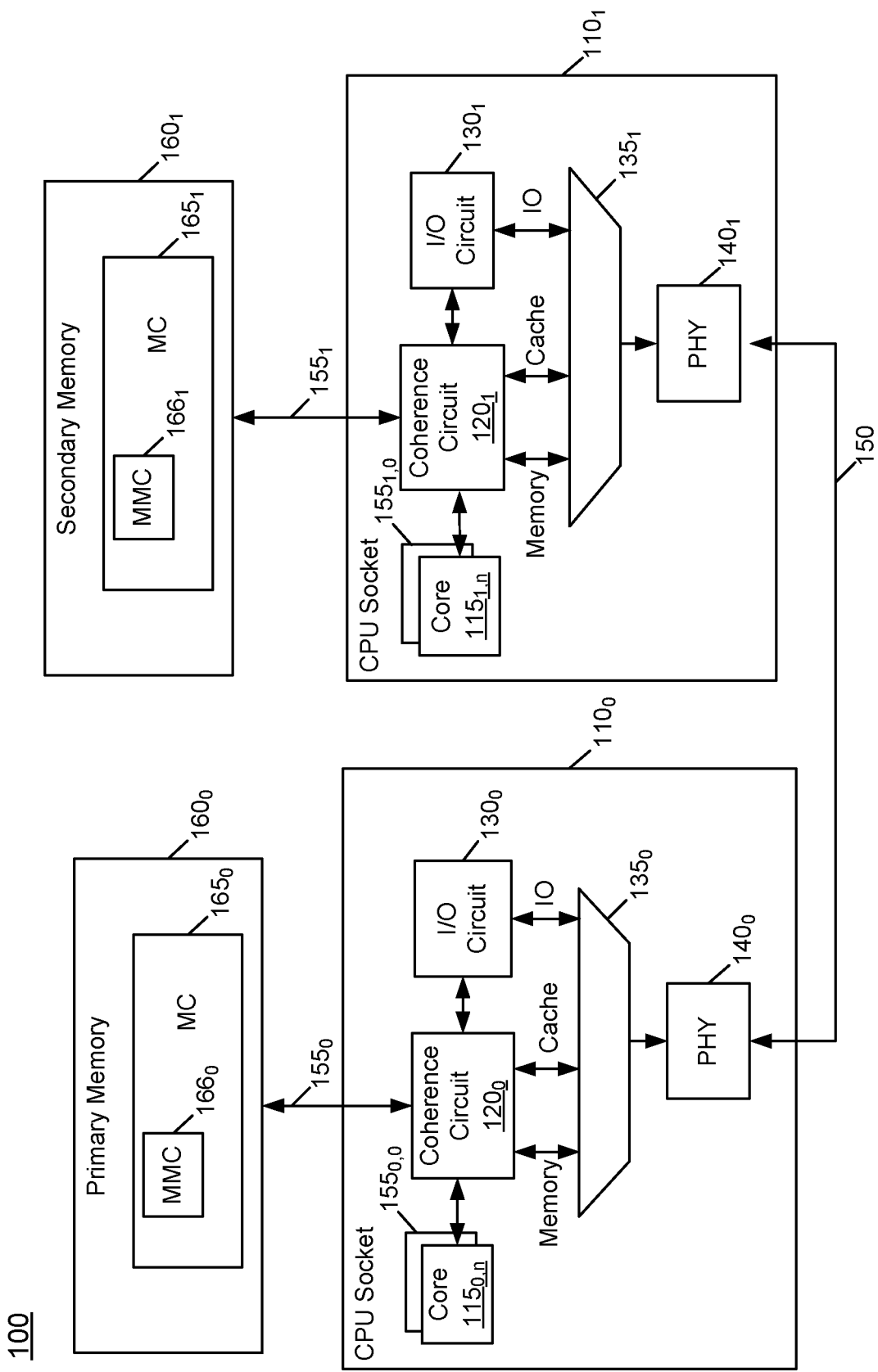
FIG. 1 is a block diagram of a system in accordance with an embodiment of the present invention.

Referring now to FIG. 1, shown is a block diagram of a system in accordance with an embodiment of the present invention. As shown in FIG. 1, system 100 is a multi-socket computing system. More specifically, system 100 may be at least a portion of a server computer, desktop computer, laptop computer or so forth, as examples.

With reference to a first processor socket $110_0$, a plurality of cores $115_{0,0}$-$115_{0,n}$ are present. Cores 115 may be homogeneous cores or there may be one or more heterogeneous cores, such as a mix of in-order and out-of-order cores. Cores 115 couple to a coherence circuit $120_0$, which may be implemented in one embodiment as a home agent. Coherence circuit $120_0$ may act as a coherent point within processor socket $110_0$ and may, in some cases, include one or more levels of cache memory, along with coherence tables such as one or more directories, memory interface circuitry and so forth. As further illustrated, first processor socket $110_0$ also includes an input/output (IO) circuit $130_0$ that acts as a controller to interface with one or more devices, either present within first processor socket $110_0$ or otherwise located within system 100.

As illustrated further in FIG. 1, first processor socket $110_0$ also includes a selection circuit $135_0$ to which coherence circuit $120_0$ and IO circuit $130_0$ couple. Selection circuit $135_0$ may act as a multiplexer to time multiplex communications of different protocols (namely all of a memory protocol, a cache protocol and an IO protocol) via a single, common physical unit circuit, namely PHY $140_0$. In one embodiment, PHY $140_0$ may be a PHY circuit in accordance with a Computer Express Link (CXL) specification. Such CXL specification may be based on a Peripheral Component Interconnect Express (PCIe) specification, such that multiple communication protocols (namely all of a memory protocol, a cache protocol, and an IO protocol such as based on a PCIe protocol) may be supported by a single PHY unit, reducing costs, power consumption and complexity.

Still with reference to FIG. 1, first processor socket $110_0$ is coupled to a memory $160_0$ by an interconnect $155_0$. In embodiments herein, memory $160_0$ may be configured as a so-called buffered memory that includes a buffer circuit between processor socket $110_0$ and the actual memory chips of memory $160_0$. To this end, in the illustration of FIG. 1 memory $160_0$ includes a memory controller $165_0$, itself including a memory mirroring circuit $166_0$, to perform memory mirroring within a buffered memory as described herein. As shown in FIG. 1, memory $160_0$ may be configured as a primary memory to support memory operations on behalf of first processor socket $110_0$. And as further described herein, another memory $160_1$ coupled to a second processor socket $110_1$ may be configured as a secondary memory to enable memory mirroring in a buffered memory architecture as described herein.

As further illustrated, first processor socket $110_0$ is coupled to second processor socket $110_1$ via an interconnect 150, which in an embodiment may be an Intel® Ultra Path Interconnect (UPI) interconnect. And a second processor socket $110_1$ may include the same components as first processor socket $110_0$. Although a single interconnect is shown for ease of illustration, understand that in different implementations, multiple UPI links may couple between the multiple processor sockets to increase bandwidth.

While shown at this high level in the embodiment of FIG. 1, many variations and alternatives are possible. For example, while FIG. 1 shows a dual socket system, embodiments are applicable to other multi-socket systems, including as examples 4 socket systems and 8 socket systems, with additional inter-processor links to couple the different sockets together.

Figure 2:
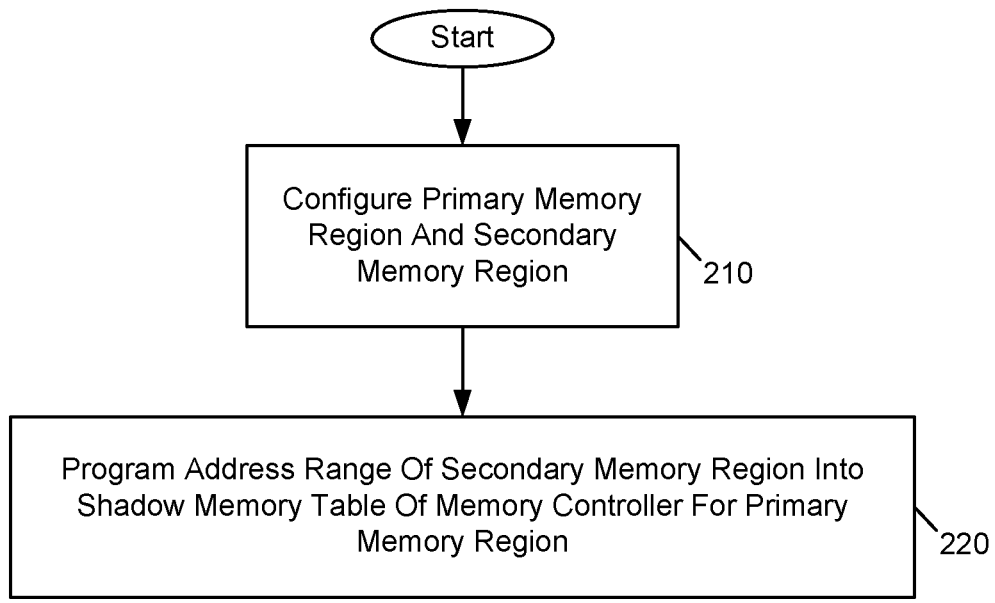
FIG. 2 is a flow diagram of a method in accordance with an embodiment of the present invention.

Referring now to FIG. 2, shown is a flow diagram of a method in accordance with an embodiment of the present invention. More specifically, method 200 is a method for configuring memory devices within a system to perform memory mirroring in a buffered memory architecture. In embodiments, method 200 may be performed by hardware circuitry, firmware, software and/or combinations thereof. As an example, system software may perform the configuration operations of FIG. 2 during configuration of a system.

As illustrated, method 200 begins by configuring a primary memory region and a secondary memory region (block 210). Such primary and secondary memory regions may be configured by setting up the first memory region, e.g., present in a first memory device, as the primary memory region and in turn mapping this primary memory region to at least one secondary memory region. In different embodiments, the secondary memory region may be present in the same memory device or a different memory device. That is, this redundant memory may be present on a different channel of the same memory device, or present on a different memory device coupled to a different IO link, or a different memory device coupled to a different processor socket. By providing this secondary or redundant memory that is present on a physically separate path (e.g., different IO link, different memory channel or different processor socket), reliability and availability of the computing platform may increase, as this arrangement enables better resilience against isolated points of failure.

Still with reference to FIG. 2, control passes to block 220 where the address range of the secondary memory region may be programmed into a shadow memory table of a memory controller for the primary memory region. This address range may include the entire memory space contained in the primary memory region. In an embodiment implemented in a buffered memory architecture, such memory controller may be present in a chip of the primary memory itself. For example, where the memories are implemented as dual in-line memory modules (DIMMs), a separate chip on a first DIMM may include a memory controller for that DIMM that in turn includes a shadow memory table with at least one entry that associates the address range of the secondary memory region with a corresponding address range of the primary memory region, and further includes routing information to the regions. In an embodiment, system software may program the address range of the secondary memory region into the memory controller. Such address range may be configured in a virtual address (VA) or host physical address (HPA) space. Understand while shown at this high level in the embodiment of FIG. 2, many variations and alternatives are possible.

Figure 3:
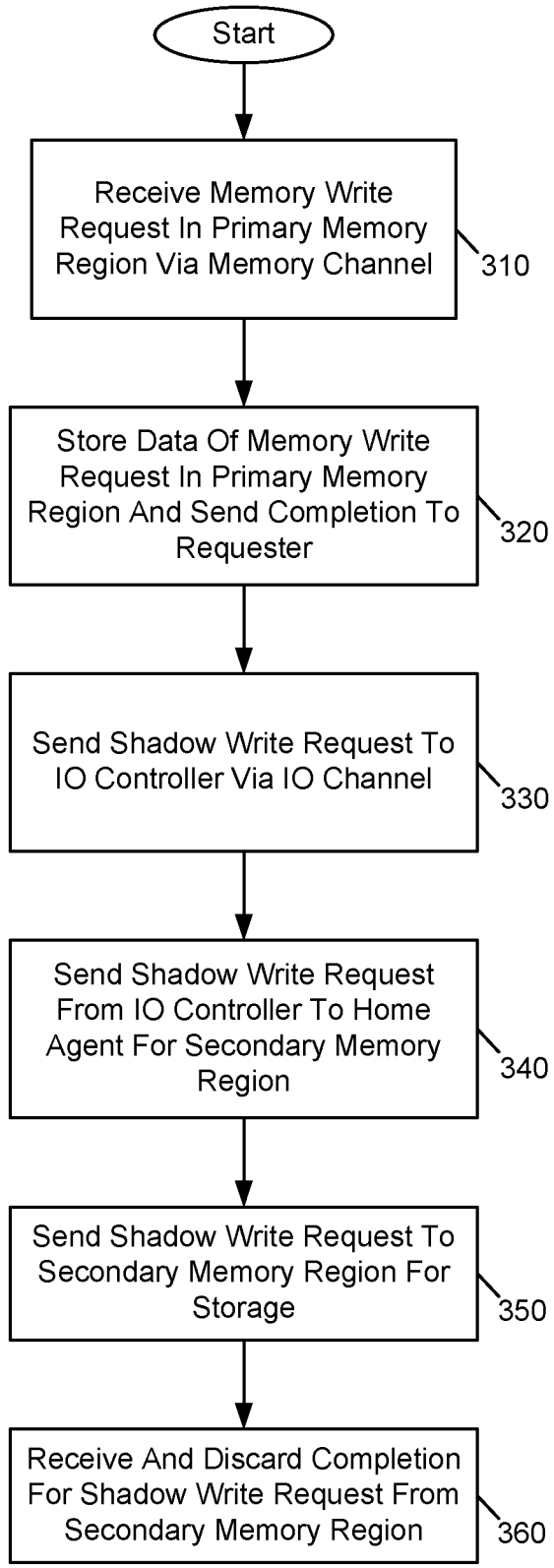
FIG. 3 is a flow diagram of a method in accordance with another embodiment of the present invention.

Referring now to FIG. 3, shown is a flow diagram of a method in accordance with another embodiment of the present invention. More specifically, method 300 is a method for performing write operations in a buffered memory architecture in accordance with an embodiment of the present invention. As such, method 300 by various components including a memory controller and associated circuitry on paths between primary and secondary memories. In embodiments, method 300 may be performed by hardware circuitry, firmware, software and/or combinations thereof.

As seen, method 300 begins by receiving a memory write request in a primary memory region via a memory channel (block 310). Such memory request may be received from a core of a first processor socket that is directly coupled to the primary memory region, e.g., via an interconnect having this memory channel to support a memory communication protocol. More specifically, at block 310 this memory write request may be received in a memory controller of the buffered memory. Understand that in response to this memory write request, the memory controller may cause the data of the memory write request to be stored in the primary memory region, e.g., at an address associated with request. Still further as shown at block 320 a completion for this memory write request may be sent to the requester, via the same memory channel.

Still with reference to FIG. 3, to enable memory mirroring such that the data stored for this memory write request is also present in the secondary memory, at block 330 the memory controller may send a shadow write request. More specifically this shadow write request may be sent to an IO controller of the first processor socket via an IO channel using the pre-programmed address of the secondary memory region. As this spawned memory write request is via an IO communication protocol (and an IO channel of an interconnect), posted semantics may be followed, such that the memory controller does not keep track of the request. Stated another way, posted transactions according to an IO communication protocol may follow, e.g., PCIe ordering of transactions, which prevents any write after write (WAW) or read after write (RAW) hazards. With an embodiment herein, understand that both the memory channel via which the original memory write request is received and this IO channel may be implemented within a single interconnect that multiplexes communications of these multiple communication protocols (namely memory and IO communication protocols) such as via a CXL interconnect in accordance with a CXL specification.

Next the IO controller in the first processor socket that receives this shadow write request may send it to a home agent for the secondary memory region (block 340). More specifically, the received shadow write request may include information to indicate destination of the shadow write request to be this home agent for the secondary memory region. In an implementation in which the memory controller uses a virtual address for the shadow memory write request, the IO controller may translate the incoming request using an IO memory management unit to derive the host physical address. Instead if the memory controller spawns the spawned memory write request using an HPA, no translation is needed.

Understand that the first processor socket may at this point treat this memory write request as any other write request and route it to the appropriate home agent of the system, such as included in another processor socket. In an embodiment in which the secondary memory region is coupled to a second processor socket that couples to the first processor socket, e.g. via an Intel® UPI interconnect, the IO controller may thus cause this shadow write request to be sent via this interconnect to the home agent of the second processor socket.

Then as further shown in FIG. 3, this home agent of the second processor socket may send the shadow write request to the secondary memory region for storage (block 350) via another memory channel, along an interconnect having this memory channel to support a memory communication protocol. Understand that in response to successful storage of this data in the secondary memory region of the secondary memory, the secondary memory (e.g., via its memory controller) may send a completion message back to the home agent of the second processor socket (also via the same memory channel). However, as this shadow write request is handled as a posted transaction, this message may simply be discarded, as illustrated at block 360. Understand while shown at this high level in the embodiment of FIG. 3, many variations and alternatives are possible.

Figure 4:
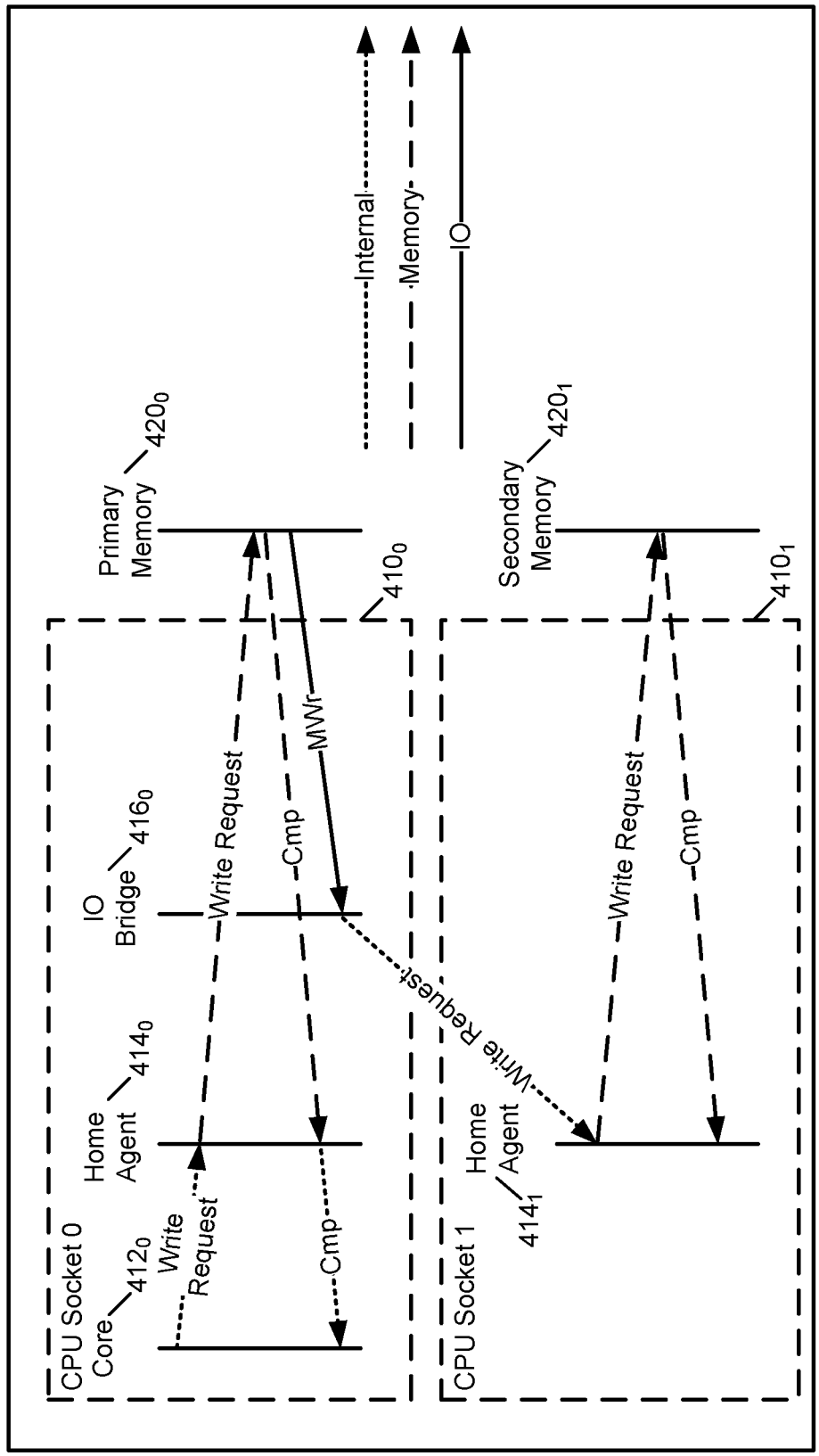
FIG. 4 is a transaction diagram illustrating transactions involved in a buffered memory mirroring write operation in accordance with an embodiment.

Referring now to FIG. 4, shown is a transaction diagram illustrating transactions involved in a buffered memory mirroring write operation in accordance with an embodiment. As shown in FIG. 4, a computing system 400 includes a buffered memory architecture. As seen, a first CPU socket $410_0$ couples to a primary memory $420_0$. In an embodiment, first CPU socket $410_0$ may couple to primary memory $420_0$ via a CXL link. With such a link, IO and memory traffic may be dynamically multiplexed on this single interconnect, where communications of these two communication protocols may be maintained in independent channels of the physical link. In addition, e.g., via an Intel® UPI link, first CPU socket $410_0$ also couples to a second CPU socket $410_1$, in turn coupled to a secondary memory $420_1$. Note that the designations of memories 420 as primary and secondary may be with regard to transactions originating from first processor socket $410_0$. That is, secondary memory $420_1$ may act as a primary memory for transactions originating in second processor socket $410_1$ while in turn primary memory $420_0$ acts as a secondary memory for such transactions. In the high level shown in FIG. 4, communications may occur according to any of an internal communication protocol, a memory communication protocol or an IO communication protocol.

As illustrated, a core $412_0$ of first processor socket $410_0$ issues a write request, which is sent to primary memory $420_0$ via a home agent $414_0$. When the write request is completed, a completion message is communicated back to core $412_0$, via home agent $414_0$. In addition, primary memory $420_0$ (and more specifically an internal memory controller which may include memory mirroring circuitry) issues a separate shadow write request to secondary memory $420_1$. As illustrated in FIG. 4, note that the write request may be received via a memory communication protocol, while this shadow memory write request may be sent via an IO communication protocol.

As further illustrated in FIG. 4, an IO bridge $416_0$, in response to receipt of the shadow memory request communicates it via an inter-processor link to a home agent $414_1$ of second processor socket $410_1$. Home agent $414_1$ in turn issues a write request to secondary memory $420_1$ to cause the same data to be stored in this memory. On successful completion of this data storage, secondary memory $420_1$ may issue a completion back to home agent $414_1$, which may simply discard this completion, as the write request sent via an IO communication protocol is a posted request.

Such operation as illustrated in FIG. 4 may occur for a plurality of write operations during normal system operation. Then when a read request is received in the primary memory for data present therein, the data may be returned to the requester (e.g., a core of the first processor socket for its use).

Instead should a failure occur within the primary memory, failover operation may proceed, such that an incoming memory request may be fulfilled with reference to data stored in the mirrored memory (namely a secondary memory as described herein). Note that failover operation may be initiated in response to a single error detected in data stored in the primary memory (which in an embodiment may be an error correction code (ECC)-protected memory). Or such failover operation may occur when more than some threshold number of such errors occurs. In another embodiment, system software may cause the failover operation, e.g., in response to observed corrected error trends and determining that a memory module is about to fail (such as based on a predictive failure analysis).

In any event, in response to a failover situation, memory read requests may be fulfilled from the secondary memory. Understand that this fulfillment from the secondary memory may occur in different ways. In some cases, prior to software updating memory mapping information to directly cause such read requests to be sent to the secondary memory, a redirection operation may occur, where the memory controller of the primary memory may redirect the memory read request from the primary memory to the secondary memory.

Figure 5:
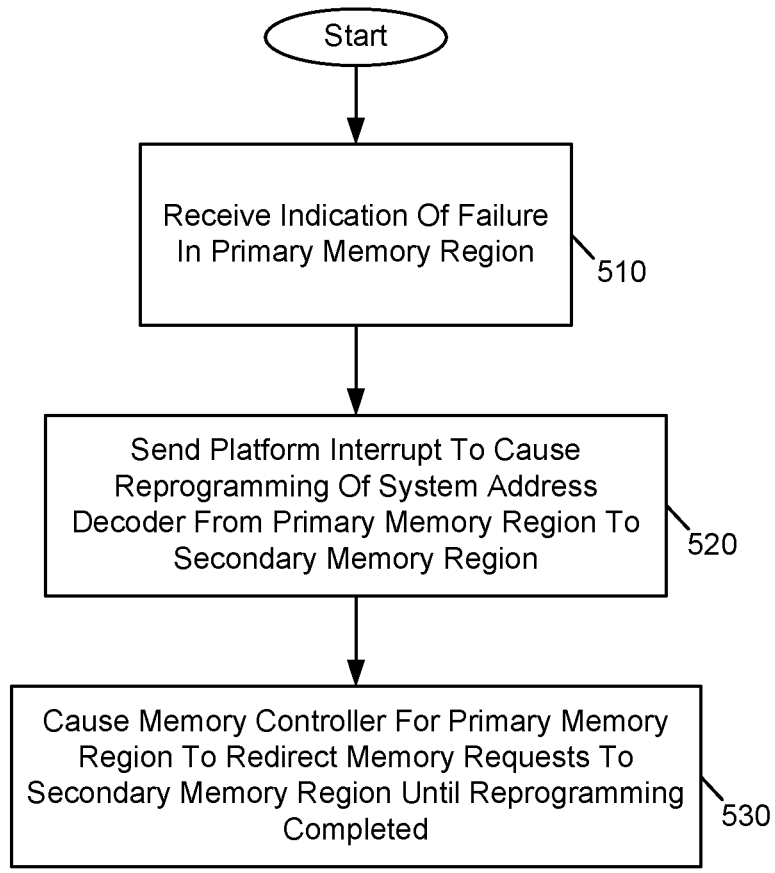
FIG. 5 is a flow diagram of a method in accordance with yet another embodiment of the present invention.

As described above, in an embodiment a failover may be reported to system software, which triggers a remapping such that requests can be fulfilled directly from a secondary memory region. Referring now to FIG. 5, shown is a flow diagram of a method in accordance with yet another embodiment of the present invention. As shown in FIG. 5, method 500 may be performed by a memory controller in combination with additional components of a multi-socket system. As such, method 500 may be performed by hardware circuitry, firmware, software and/or combinations thereof.

As illustrated, method 500 begins by receiving an indication of a failure in a primary memory region (block 510). This failure indication may be received in various manners, but in the embodiment of FIG. 5, assume that this failure indication is received in a memory controller of the primary memory, e.g., in response to the failure of at least one ECC or other error detection scheme within the primary memory. Note that in other cases, rather than an indication of an actual failure, an indication of predicted imminent failure may be received. In turn, at block 520 the memory controller may send a platform interrupt to advise the system software of the failure (or predicted imminent failure) of the primary memory. As a result of this platform interrupt, the system software may cause a reprogramming of a system address decoder from the primary memory region to the secondary memory region. For example, an OS or BIOS may update a system address decoder within a first processor socket for which the failing memory is the primary memory region to cause this system address decoder to direct memory requests to the secondary memory region instead of the primary memory region. This update thus causes the secondary memory region to be the primary memory region. And after a hot plug operation, newly added memory may become the secondary region for this primary memory region. As such, embodiments enable a high availability system to avoid a system crash, even when a failure occurs in a primary memory region, by way of this switch over to the secondary memory region.

Note that before such reprogramming occurs, which may incur some amount of latency, memory requests may be received within the primary memory. As such, method 500 may further cause a redirection of such incoming memory requests. More specifically at block 530 the memory controller may redirect any incoming memory requests to the secondary memory region until it receives an indication that reprogramming of the system address decoder has been completed. To effect this operation, the memory controller may update a mirroring state to indicate the failure, so that the memory controller shadows all reads and writes to the secondary memory region. In this way, such memory requests (e.g., read operations) may be fulfilled using data stored in the redundant or secondary memory region. By way of the identification of an error situation on the primary memory region, the associated memory controller may, via hardware, provide for autonomous redirection to prevent a system crash. Thus incoming memory requests may still be serviced after identification of an error or other failure in the primary memory region and prior to system software reprogramming the system for failover operation.

As yet another option on identification of a failure or predicted imminent failure in the primary memory region, a home agent of a processor associated with the primary memory region may redirect incoming read and write requests. To effect this operation, the home agent for the primary memory region may update a mirroring state to indicate the failure, so that the home agent thereafter sends all reads and writes to the secondary memory region.

Also understand that in embodiments herein with a buffered memory architecture in which buffer circuitry is associated with the memories (e.g., one or more separate chips on the DIMMs that may include registers or other temporary storage along with an associated memory controller), integrated memory controllers of processor sockets may be unaware of the actual organization of the primary and secondary memory regions in a mirrored configuration. That is, the integrated memory controller does not have understanding of the actual organization of the memory devices (e.g., number of channels, type of memory and so forth), other than that such memory is coupled to the processor socket via a given link. Understand while shown at this high level in the embodiment of FIG. 5, many variations and alternatives are possible.

Figure 6:
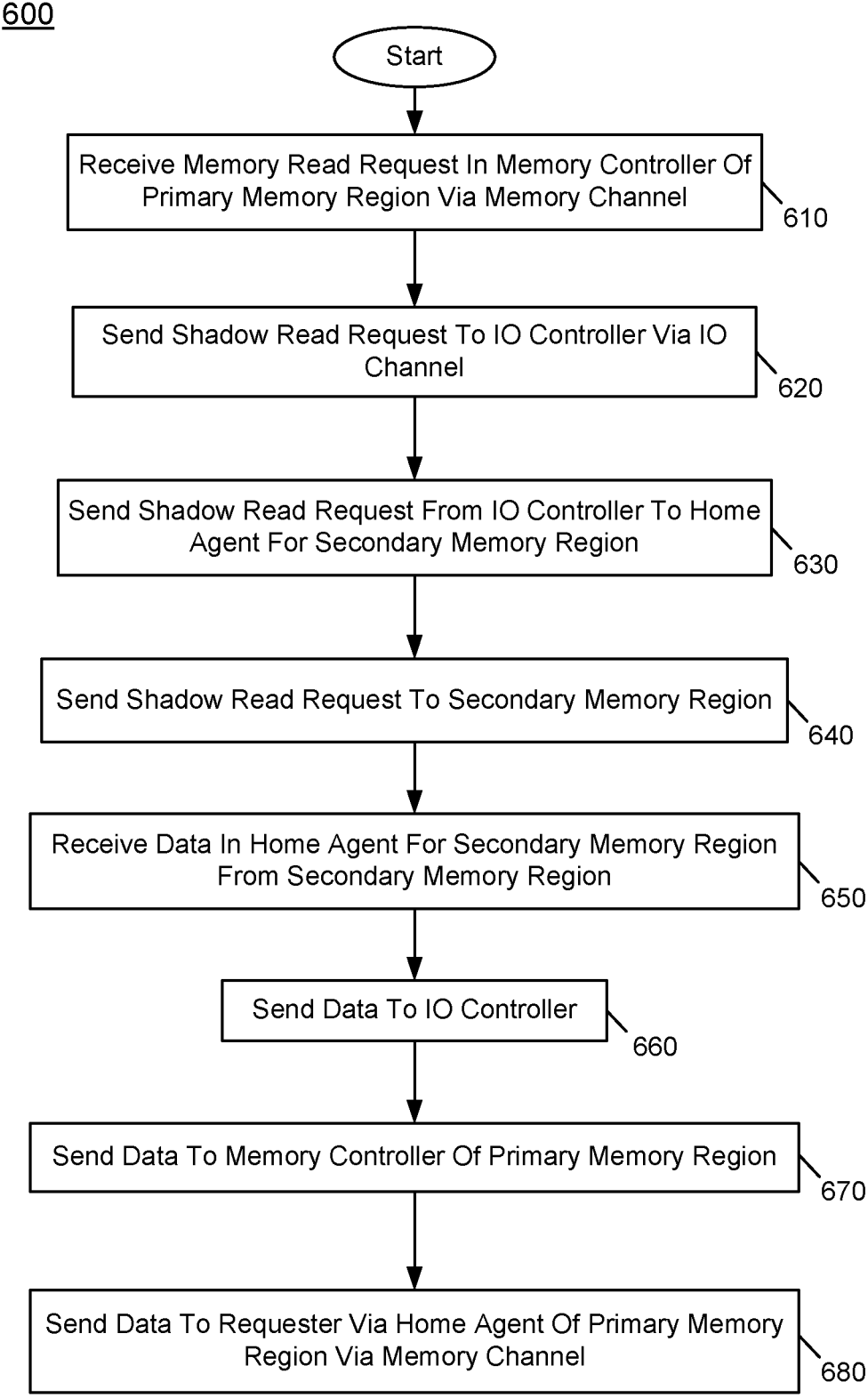
FIG. 6 is a flow diagram of a method in accordance with another embodiment of the present invention.

Referring now to FIG. 6, shown is a flow diagram of a method in accordance with another embodiment of the present invention. More specifically, method 600 is a method for performing read operations in a buffered memory architecture in accordance with an embodiment of the present invention. As such, method 600 may be performed by various components including a memory controller and associated circuitry on paths between primary and secondary memories. In embodiments, method 600 may be performed by hardware circuitry, firmware, software and/or combinations thereof.

More specifically, method 600 is a method for handling memory read requests when a failure has been detected in a primary memory. As such, method 600 may be performed after error detection and prior to completion of a failover operation to the secondary memory. Method 600 begins by receiving a memory read request in a primary memory region via a memory channel (block 610). Such read request may be received from a core of a first processor socket that is directly coupled to the primary memory region, e.g., via an interconnect having this memory channel to support a memory communication protocol. Given the failure in the primary memory, and in response to this read request directed to the failed primary memory region, the associated memory controller may generate and send a shadow read request (block 620). Note herein that the term "spawned memory region" equally refers to a shadow memory request that a memory controller sends to another memory to effect mirroring. More specifically, the memory controller may send this shadow read request to an IO controller of the first processor socket via an IO channel. In turn, the IO controller sends this shadow read request to a home agent for the secondary memory region (block 630), which may be present on a second processor socket coupled to a secondary memory that includes the secondary memory region.

Still referring to FIG. 6, the home agent sends the shadow read request to the secondary memory region to cause data at an address associated with request to be read (block 640). At block 650, the home agent receives the return of data from the memory, and at block 660, it sends it to the IO controller (of the first processor socket). In turn, at block 670 the IO controller sends the data to the memory controller of the primary memory region. Finally, at block 680, the data is sent to the requester (e.g., a core of the first processor socket). Note that this return of data is through the home agent of the first processor socket via the memory channel, such that this data return appears to the core as if it were from the primary region (albeit with a greater latency due to the redirection illustrated). Understand while shown at this high level in the embodiment of FIG. 6, many variations and alternatives are possible.

Figure 7:
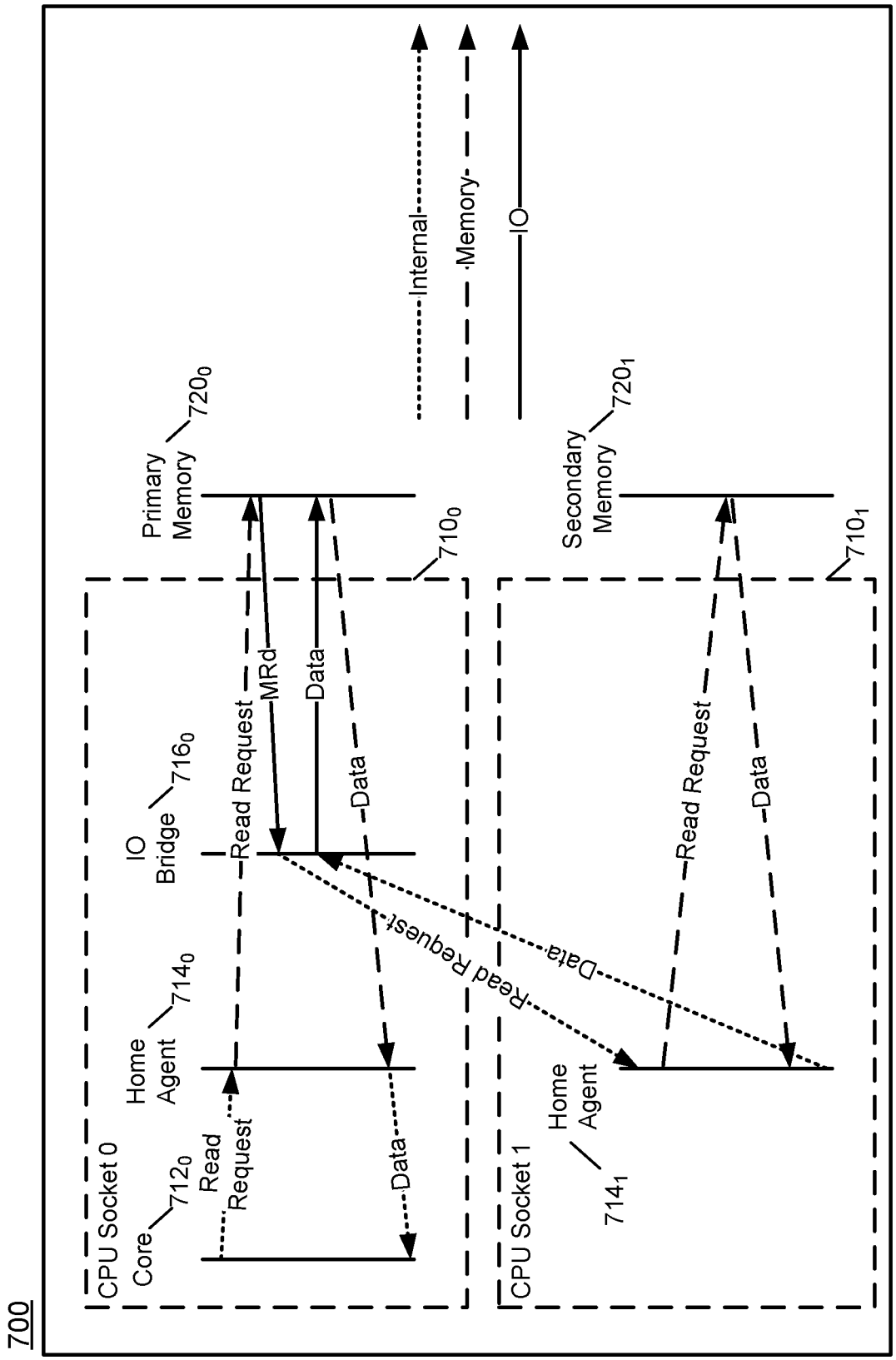
FIG. 7 is a transaction diagram illustrating transactions involved in a buffered memory mirroring read operation involving a redirection in accordance with an embodiment.

Referring now to FIG. 7, shown is a transaction diagram illustrating transactions involved in a buffered memory mirroring read operation involving a redirection in accordance with an embodiment. As shown in FIG. 7, a computing system 700 includes a buffered memory architecture, and which may be configured the same as computing system 400 of FIG. 4 (and thus reference numerals refer to the same components, albeit the "700" series in place of the "400" series of FIG. 4). As seen, first CPU socket 710$_0$ couples to primary memory 720$_0$ and also couples to second CPU socket 710$_1$, in turn coupled to secondary memory 720$_1$.

As illustrated, core 712$_0$ of first processor socket 710$_0$ issues a read request, which is sent to primary memory 720$_0$ via a home agent 714$_0$. Assume a situation in which a failure previously was identified in primary memory 720$_0$, the memory controller issues a shadow read request, via IO bridge 716$_0$, and in turn, to home agent 714$_1$ of second processor socket 710$_1$. Home agent 714$_1$ in turn issues a read request to secondary memory 720$_1$ to return the data, which home agent 714$_1$ sends back to the memory controller of primary memory 720$_0$, via IO bridge 716$_0$. Finally, the memory controller sends the data back to requesting core 712$_0$, via the memory channel. Understand while shown at this high level in FIG. 7, many variations and alternatives are possible.

Figure 8:
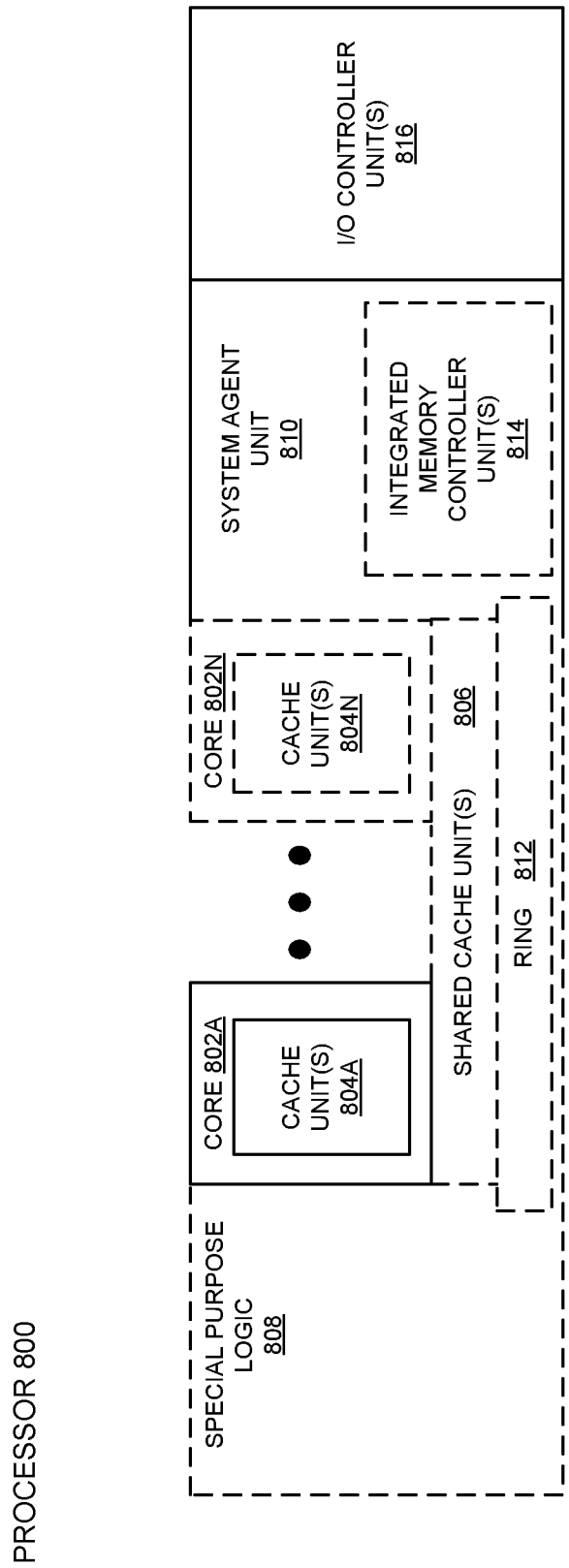
FIG. 8 is a block diagram of a processor according to embodiments of the invention.

FIG. 8 is a block diagram of a processor 800 that may have more than one core, may have an integrated memory controller, and may have integrated graphics according to embodiments of the invention. The solid lined boxes in FIG. 8 illustrate a processor 800 with a single core 802A, a system agent 810, a set of one or more IO controller units 816, while the optional addition of the dashed lined boxes illustrates an alternative processor 800 with multiple cores 802A-N, a set of one or more integrated memory controller unit(s) 814 in the system agent unit 810, and special purpose logic 808.

Thus, different implementations of the processor 800 may include: 1) a CPU with the special purpose logic 808 being integrated graphics and/or scientific (throughput) logic (which may include one or more cores), and the cores 802A-N being one or more general purpose cores (e.g., general purpose in-order cores, general purpose out-of-order cores, a combination of the two); 2) a coprocessor with the cores 802A-N being a large number of special purpose cores intended primarily for graphics and/or scientific (throughput); and 3) a coprocessor with the cores 802A-N being a large number of general purpose in-order cores. Thus, the processor 800 may be a general purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 800 may be a part of and/or may be implemented on one or more substrates using any of a number of process technologies, such as, for example, BiCMOS, CMOS, or NMOS.

The memory hierarchy includes one or more levels of cache within the cores 804A-N, a set or one or more shared cache units 806, and external memory (not shown) coupled to the set of integrated memory controller units 814. Note that memory mirroring in a buffered memory architecture in accordance with an embodiment may remain transparent to the set of integrated memory controller units 814, such that responsive to memory requests within core or within processor 800, integrated memory controller unit 814 may simply direct the transactions to the appropriate destination memory based on information stored in a system address decoder, which in an embodiment may be located in the set of shared cache units 806.

The set of shared cache units 806 may include one or more mid-level caches, such as level 2 (L2), level 3 (L3), level 4 (L4), or other levels of cache, a last level cache (LLC), and/or combinations thereof. While in one embodiment a ring based interconnect unit 812 interconnects the special purpose logic 808, the set of shared cache units 806, and the system agent unit 810/integrated memory controller unit(s) 814, alternative embodiments may use any number of well-known techniques for interconnecting such units. In one embodiment, coherency is maintained between one or more cache units 806 and cores 802-A-N.

In some embodiments, one or more of the cores 802A-N are capable of multi-threading. The system agent 810 includes those components coordinating and operating cores 802A-N. The system agent unit 810 may include for example a power control unit (PCU) and a display unit. The PCU may be or include logic and components needed for regulating the power state of the cores 802A-N and the special purpose logic 808.

The cores 802A-N may be homogenous or heterogeneous in terms of architecture instruction set; that is, two or more of the cores 802A-N may be capable of execution the same instruction set, while others may be capable of executing only a subset of that instruction set or a different instruction set.

Figure 9:
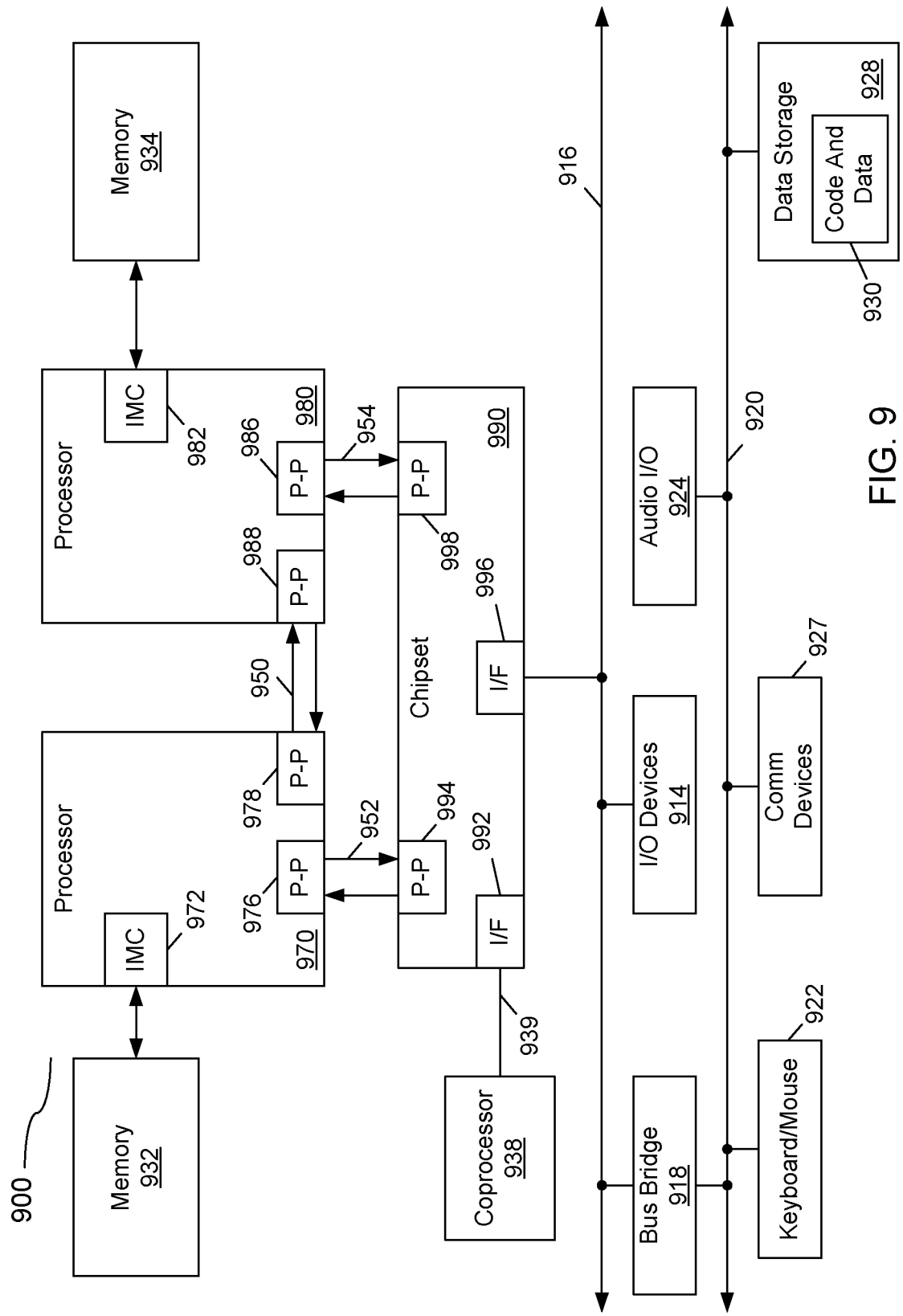
FIG. 9 is a block diagram of a first more specific exemplary system in accordance with an embodiment of the present invention.
Figure 10:
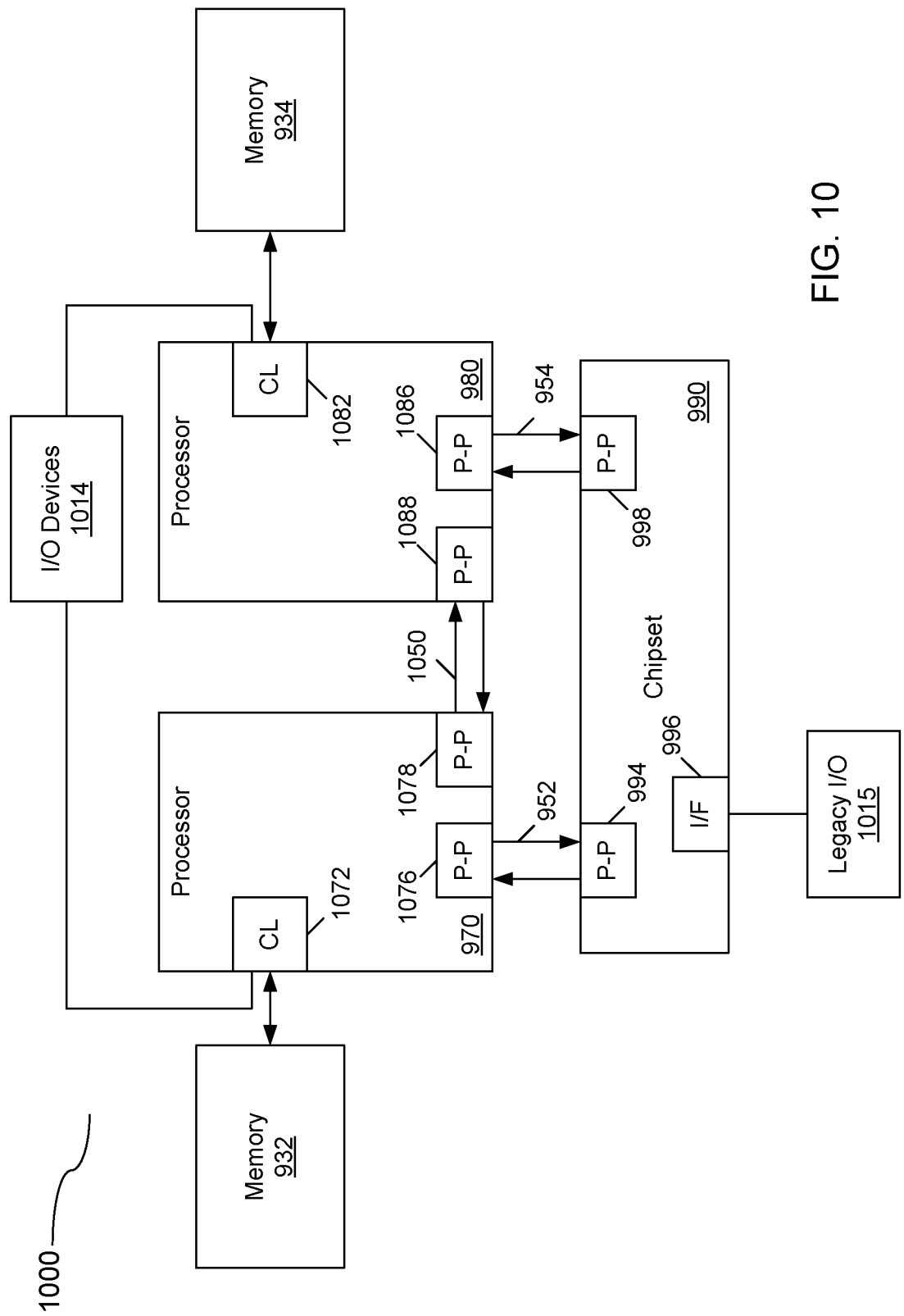
FIG. 10 is a block diagram of a second more specific exemplary system in accordance with an embodiment of the present invention.

FIGS. 9-10 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Referring now to FIG. 9, shown is a block diagram of a first more specific exemplary system 900 in accordance with an embodiment of the present invention. As shown in FIG. 9, multiprocessor system 900 is a point-to-point interconnect system, and includes a first processor 970 and a second processor 980 coupled via a point-to-point interconnect 950 such as one or more Intel® UPI links. Each of processors 970 and 980 may be some version of the processor 800.

Processors 970 and 980 are shown including integrated memory controller (IMC) units 972 and 982, respectively. As described above, IMC units 972 and 983 may not be aware of the memory mirroring implementation, which may remain transparent to these units. Processor 970 also includes as part of its IO controller units point-to-point (P-P) interfaces 976 and 978; similarly, second processor 980 includes P-P interfaces 986 and 988. Processors 970, 980 may exchange information via a point-to-point (P-P) interface 950 using P-P interface circuits 978, 988. As shown in FIG. 9, IMCs 972 and 982 couple the processors to respective memories, namely a memory 932 and a memory 934, which may be portions of main memory locally attached to the respective processors. Memories 932, 934 may be configured as buffered memories and adapted to perform memory mirroring as described herein. As such, representative memory 932 (as an example) may be configured as a primary memory region for processor 970 and memory 934 may be configured as a secondary memory region for processor 970. Understand that the reverse relationship may inhere with regard to memory 934, with respect to processors 970 and 980.

Processors 970, 980 may each exchange information with a chipset 990 via individual P-P interfaces 952, 954 using point-to-point interface circuits 976, 994, 986, 998. Chipset 990 may optionally exchange information with the coprocessor 938 via a high performance interface 992. In one embodiment, the coprocessor 938 is a special-purpose processor, such as, for example, a high throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 990 may be coupled to a first bus 916 via an interface 996. In one embodiment, first bus 916 may be a PCI bus, or a bus such as a PCI Express bus or another I/O interconnect bus, although the scope of the present invention is not so limited.

As shown in FIG. 9, various I/O devices 914 may be coupled to first bus 916, along with a bus bridge 918 which couples first bus 916 to a second bus 920. In one embodiment, one or more additional processor(s) 915, such as coprocessors, high-throughput MIC processors, GPGPU's, accelerators (such as, e.g., graphics accelerators or digital signal processing (DSP) units), field programmable gate arrays, or any other processor, are coupled to first bus 916.

In one embodiment, second bus 920 may be a low pin count (LPC) bus. Various devices may be coupled to a second bus 920 including, for example, a keyboard and/or mouse 922, communication devices 927 and a storage unit 928 such as a disk drive or other mass storage device which may include instructions/code and data 930, in one embodiment. Further, an audio I/O 924 may be coupled to the second bus 916. Note that other architectures are possible. For example, instead of the point-to-point architecture of FIG. 9, a system may implement a multi-drop bus or other such architecture.

Referring now to FIG. 10, shown is a block diagram of a second more specific exemplary system 1000 in accordance with an embodiment of the present invention. Like elements in FIGS. 9 and 10 bear like reference numerals, and certain aspects of FIG. 9 have been omitted from FIG. 10 in order to avoid obscuring other aspects of FIG. 10.

FIG. 10 illustrates that the processors 970, 980 may include integrated memory and I/O control logic ("CL") 1072 and 1082, respectively. Thus, the CL 1072, 1082 include integrated memory controller units as in FIG. 9 and include I/O control logic. FIG. 10 illustrates that not only are the memories 932, 934 coupled to the CL 972, 982, but also that I/O devices 1014 are also coupled to the control logic 972, 982. Legacy I/O devices 1015 are coupled to the chip set 990.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 930 illustrated in FIG. 9, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 11:
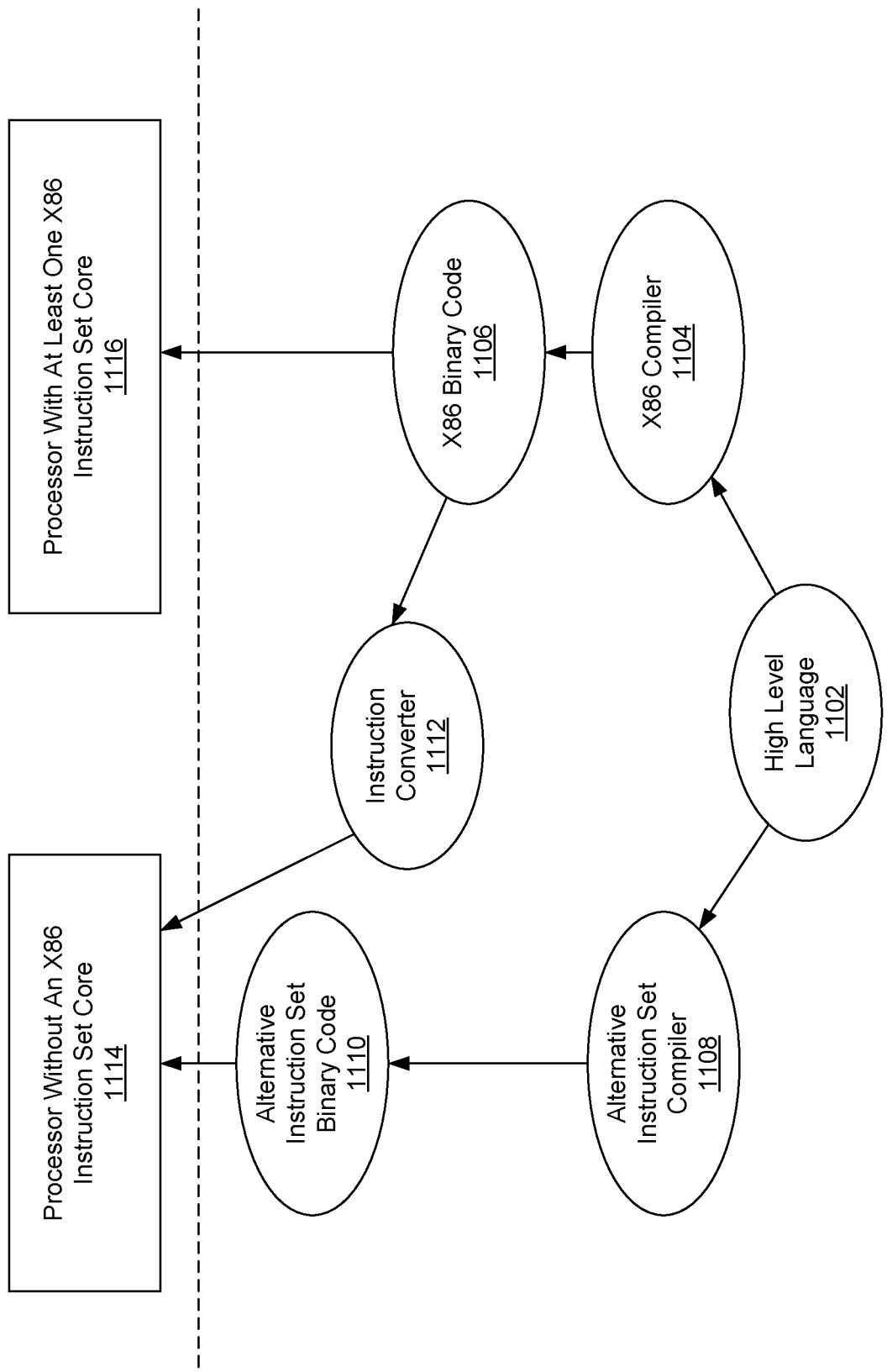
FIG. 11 is a block diagram contrasting the use of a software instruction converter to convert binary instructions in a source instruction set to binary instructions in a target instruction set according to embodiments of the invention.

FIG. 11 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 11 shows a program in a high level language 1102 may be compiled using a first compiler 1104 to generate a first binary code (e.g., x86) 1106 that may be natively executed by a processor with at least one first instruction set core 1116. In some embodiments, the processor with at least one first instruction set core 1116 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel® processor with at least one x86 instruction set core. The first compiler 1104 represents a compiler that is operable to generate binary code of the first instruction set 1106 (e.g., object code) that can, with or without additional linkage processing, be executed on the processor with at least one first instruction set core 1116. Similarly, FIG. 11 shows the program in the high level language 1102 may be compiled using an alternative instruction set compiler 1108 to generate alternative instruction set binary code 1110 that may be natively executed by a processor without at least one first instruction set core 1114 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1112 is used to convert the first binary code 1106 into code that may be natively executed by the processor without a first instruction set core 1114. This converted code is not likely to be the same as the alternative instruction set binary code 1110 because an instruction converter capable of this is difficult to make; however, the converted code will accomplish the general operation and be made up of instructions from the alternative instruction set. Thus, the instruction converter 1112 represents software, firmware, hardware, or a combination thereof that, through emulation, simulation or any other process, allows a processor or other electronic device that does not have a first instruction set processor or core to execute the first binary code 1106.

The following examples pertain to further embodiments.

In one example, an apparatus includes: a first memory controller to control access to a first memory and including a memory mirroring circuit, in response to a memory write request from a first processor socket for which the first memory comprises a primary memory region, to cause data associated with the memory write request to be written to the first memory and to send a shadow memory write request to a second memory to cause the second memory to write the data into a secondary memory region; and a shadow memory table including a plurality of entries each to store an association between a primary memory region and a secondary memory region. The memory mirroring circuit may also access the shadow memory table to identify the secondary memory region.

In an example, the memory mirroring circuit is to send the shadow memory write request to the second memory via an input/output circuit of the first processor socket, the memory mirroring circuit to send the shadow memory write request to the input/output circuit according to an input/output communication protocol.

In an example, the first memory controller is to receive the memory write request according to a memory communication protocol.

In an example, the apparatus further comprises an interconnect to couple the first processor socket to the first memory, the interconnect to handle communications according to the memory communication protocol and the input/output communication protocol.

In an example, the input/output circuit is to send the shadow memory write request to a home agent of a second processor socket via an inter-processor interconnect.

In an example, the home agent of the second processor socket is to send the shadow memory write request to the second memory as a posted transaction, where the home agent of the second processor socket is to receive and discard a completion for the posted transaction.

In an example, in response to a failure or a predicted imminent failure in the first memory, the memory mirroring circuit is to redirect a memory request from the first memory region to the second memory region.

In an example, in response to a failure or a predicted imminent failure in the first memory, a system address decoder of the first processor socket is to be re-mapped from the first memory region to the second memory region.

In an example, the first memory and the second memory comprise buffered memories, the first memory coupled to the first processor socket via a first memory channel and the second memory coupled to a second processor socket via a second memory channel.

In another example, a method comprises: receiving, in a first memory controller associated with a first memory comprising a primary memory region, a read request, where the first memory has incurred one or more failures; sending, from the first memory controller, a spawned memory read request to a second memory comprising a secondary memory region to obtain data associated with the read request; receiving the data in the first memory controller in response to the spawned memory read request; and sending the data to a requester of the read request.

In an example, the method further comprises: sending the spawned memory read request from the first memory controller to the second memory via an input/output circuit of a first processor socket coupled to the first memory via an input/output communication protocol; and receiving the data in the first memory controller from the input/output circuit via the input/output communication protocol.

In an example, the method further comprises sending the spawned memory read request from the input/output circuit of the first processor socket to a home agent of a second processor socket, the second processor socket coupled to the second memory.

In an example, the method further comprises accessing a shadow memory table having a plurality of entries each to store an association between a primary memory region and a secondary memory region, to identify the secondary memory region.

In an example, the method further comprises, in response to a notification of the one or more failures, re-mapping at least one entry of a system address decoder from the first memory region to the second memory region.

In an example, the method further comprises: receiving a second read request in a first processor socket coupled to the first memory; accessing the system address decoder based on an address of the second read request; and based on the remapped at least one entry of the system address decoder, sending the second read request to a home agent of a second processor socket coupled to the second memory to obtain second data associated with the second read request from the second memory.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In another example, a system includes a first processor socket comprising: at least one core; a coherence circuit to manage coherency of information stored in a first memory; and an input/output circuit coupled to the at least one core to communicate according to an input/output communication protocol. The system may further include the first memory coupled to the first processor socket via a first interconnect. The first memory includes a first memory controller having a memory mirroring circuit, in response to a memory write request received from the first processor socket according to a memory communication protocol, to cause data associated with the memory write request to be written to a primary memory region of the first memory and send a shadow memory write request according to the input/output communication protocol to the input/output circuit, where the input/output circuit is to send the shadow memory write request to a second processor socket coupled to a second memory to cause the second memory to write the data into a secondary memory region. The system may further include the second processor socket coupled to the first processor socket via an inter-processor interconnect and the second memory coupled to the second processor socket via a second interconnect.

In an example, the first memory and the second memory comprise buffered memories, the first memory coupled to the first processor socket via a first memory channel and the second memory coupled to the second processor socket via a second memory channel. The first memory comprises the primary memory region for the first processor socket and the second memory comprises the secondary memory region for the second processor socket.

In an example, the first interconnect is to handle communications according to the memory communication protocol and the input/output communication protocol.

In an example, the first processor socket comprises a system address decoder to identify the first memory having the primary memory region, and in response to a failure of the first memory, to update the system address decoder to identify the second memory having the primary memory region.

In an example, the first memory controller, in response to a failure in the first memory, is to redirect a memory read request from the first processor socket for the data in the first memory region to the second processor socket to cause the second processor socket to obtain the data from the secondary memory region and return the data to the first processor socket.

In an example, the coherence circuit, in response to a failure or a predicted failure in the first memory, is to update a mirroring state of the coherence circuit, and send one more memory access requests received in the coherence circuit for the first memory region to the second processor socket to cause the second processor socket to perform memory accesses to the secondary memory region for the one or more memory access requests.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
   a first memory controller comprising a memory mirroring circuit to control access to a primary memory region and in response to a memory write request received from a first processor socket via a first memory channel, the first memory controller is to:
      cause data associated with the memory write request to be written to the primary memory region; and
      send a shadow memory write request to the first processor socket coupled to the first memory controller to cause the first processor socket to send the shadow memory write request to a second processor socket coupled to the first processor socket, the second processor socket coupled to a second memory controller is to cause the second memory controller to write the data associated with the memory write request to a secondary memory region and to send a completion for the shadow memory write request to the second processor socket to be discarded by the second processor socket; and
   a shadow memory table including a plurality of entries each to store an association between the primary memory region and the secondary memory region, wherein the memory mirroring circuit is to access the shadow memory table to identify the secondary memory region.

2. The apparatus of claim 1, wherein the memory mirroring circuit of the first memory controller is to send the shadow memory write request to the second memory controller via an input/output circuit of the first processor socket, according to an input/output communication protocol.

3. The apparatus of claim 2, wherein the first memory controller is to receive the memory write request from the first processor socket according to a memory communication protocol.

4. The apparatus of claim 3, further comprising an interconnect to couple the first processor socket to the first memory controller, wherein the interconnect is to handle communications according to the memory communication protocol and the input/output communication protocol.

5. The apparatus of claim 2, wherein the input/output circuit of the first processor socket is to send the shadow memory write request to a home agent of the second processor socket via an inter-processor interconnect.

6. The apparatus of claim 5, wherein the home agent of the second processor socket is to send the shadow memory write request to the second memory controller as a posted transaction, wherein the home agent of the second processor socket is to receive and discard the completion for the shadow memory write request.

7. The apparatus of claim 1, wherein in response to one of a failure and a predicted imminent failure in the primary memory region, the memory mirroring circuit is to redirect a memory request from the primary memory region to the secondary memory region.

8. The apparatus of claim 1, wherein in response to one of a failure and a predicted imminent failure in the primary memory region, a system address decoder of the first processor socket is to be re-mapped from the primary memory region to the secondary memory region.

9. The apparatus of claim 1, wherein a first memory comprising the first memory controller and the primary memory region and a second memory comprising the second memory controller and the secondary memory region comprise buffered memories, the first memory coupled to the first processor socket via the first memory channel and the second memory coupled to the second processor socket via a second memory channel.

10. A machine-readable medium having stored thereon instructions, which if performed by a machine cause the machine to perform a method comprising:
receiving, in a first memory controller associated with a first memory comprising a primary memory region, a read request from a first processor socket coupled to the first memory, wherein the first memory has incurred one or more failures;
sending, from the first memory controller, a spawned memory read request to obtain data associated with the read request to an input/output controller of the first processor socket via an input/output channel to cause the input/output controller to send the spawned memory read request to a second processor socket coupled to a second memory comprising a secondary memory region to obtain the data associated with the read request from the secondary memory region;
receiving the data associated with the read request in the first memory controller from the second memory via the second processor socket and the input/output controller of the first processor socket in response to the spawned memory read request; and
sending the data from the first memory controller to the first processor socket.

11. The machine-readable medium of claim 10, wherein the method further comprises:
sending the spawned memory read request from the first memory controller to the input/output controller of the first processor socket via an input/output communication protocol; and
receiving the data associated with the read request in the first memory controller from the input/output controller via the input/output communication protocol.

12. The machine-readable medium of claim 10, wherein the method further comprises sending the spawned memory read request from the input/output controller of the first processor socket to a home agent of the second processor socket.

13. The machine-readable medium of claim 10, wherein the method further comprises accessing a shadow memory table having a plurality of entries each to store an association between the primary memory region and the secondary memory region, to identify the secondary memory region.

14. The machine-readable medium of claim 10, wherein the method further comprises, in response to a notification of the one or more failures, re-mapping at least one entry of a system address decoder from the primary memory region to the secondary memory region.

15. The machine-readable medium of claim 14, wherein the method further comprises:
receiving a second read request in the first processor socket coupled to the first memory;
accessing the system address decoder based on an address of the second read request; and
based on the remapped at least one entry of the system address decoder, sending the second read request to a home agent of the second processor socket coupled to the second memory to obtain second data associated with the second read request from the second memory.

16. A system comprising:
a first processor socket comprising:
at least one core;
a coherence circuit to manage coherency of information stored in a first memory; and
an input/output circuit coupled to the at least one core to communicate according to an input/output communication protocol;
the first memory coupled to the first processor socket via a first interconnect comprising a first memory channel and an input/output channel, the first memory comprising a first memory controller having a memory mirroring circuit and a primary memory region, wherein in response to a memory write request received from the first processor socket according to a memory communication protocol via the first memory channel, the first memory controller to:
cause data associated with the memory write request to be written to the primary memory region of the first memory; and
send a shadow memory write request according to the input/output communication protocol to the input/output circuit of the first processor socket via the input/output channel, wherein the input/output circuit of the first processor socket is to send the shadow memory write request to a second processor socket coupled to a second memory comprising a second memory controller and a secondary memory region and the second processor socket is to cause the second memory controller to write the data associated with the shadow memory write request to the secondary memory region and to send a completion for the shadow memory write request to the second processor socket to be discarded by the second processor socket;
the second processor socket coupled to the first processor socket via an inter-processor interconnect; and
the second memory coupled to the second processor socket via a second interconnect.

17. The system of claim 16, wherein the first memory comprising the first memory controller and the primary memory region and the second memory comprising the second memory controller and the secondary memory region comprise buffered memories, the first memory coupled to the first processor socket via the first memory channel and the second memory coupled to the second processor socket via a second memory channel.

18. The system of claim 16, wherein the first interconnect is to handle communications according to the memory communication protocol and the input/output communication protocol.

19. The system of claim 16, wherein the first processor socket comprises a system address decoder to identify the first memory having the primary memory region, and in response to a failure of the first memory, to update the system address decoder to identify the second memory having the primary memory region.

20. The system of claim 16, wherein the first memory controller, in response to a failure in the first memory, is to redirect a memory read request from the first processor socket for data associated with the memory read request in the first memory region to the second processor socket to cause the second processor socket to obtain the data associated with the memory read request from the secondary memory region and return the data associated with the memory read request to the first processor socket.

21. The system of claim 16, wherein the coherence circuit, in response to one of a failure and a predicted failure in the first memory, is to update a mirroring state of the coherence circuit, and send one more memory access requests received in the coherence circuit for the primary memory region to the second processor socket to cause the second processor socket to perform memory accesses to the secondary memory region for the one or more memory access requests.

* * * * *